United States Patent
Monti

[15] 3,635,103
[45] Jan. 18, 1972

[54] PLANETARY REDUCTION GEARING

[72] Inventor: Giancarlo Monti, Varese, Italy
[73] Assignee: Siai-Marchetti S.p.A., Varese, Italy
[22] Filed: Dec. 23, 1969
[21] Appl. No.: 887,797

[30] Foreign Application Priority Data

Dec. 24, 1968 Italy ................. 25562A68

[52] U.S. Cl. .................................... 74/801, 308/62
[51] Int. Cl. ............................ F16h 1/28, F16c 23/10
[58] Field of Search .................... 74/801, 802; 308/62

[56] References Cited

UNITED STATES PATENTS

| | | | |
|---|---|---|---|
| 1,586,309 | 5/1926 | Hult | 74/801 |
| 2,281,875 | 5/1942 | Gleissner | 308/62 X |
| 2,547,877 | 4/1951 | Lucia | 74/801 |
| 3,178,966 | 4/1965 | Wildheber | 74/801 |
| 3,227,006 | 1/1966 | Bowen, Jr. | 74/801 |
| 3,257,869 | 6/1966 | Sharples | 74/801 |
| 3,293,948 | 12/1966 | Jarchow et al. | 74/801 |
| 3,315,547 | 4/1967 | Fritsch | 74/801 |

*Primary Examiner*—Arthur T. McKeon
*Attorney*—Kurt Kelman

[57] ABSTRACT

System for mounting a planet wheel on a planet carrier wherein the axis of rotation of said wheel is concentric with the pitch circle thereof and the planet wheel is supported about an axis eccentric thereto.

3 Claims, 3 Drawing Figures

INVENTOR.
GIANCARLO MONTI
BY
AGENT

PLANETARY REDUCTION GEARING

The present invention relates to reduction gear mechanisms, and in particular to a system for mounting planet wheels in a planetary gear devices.

Conventionally, planet wheels of a planetary gearing device are secured to a carrier by individual axles or shafts provided with roller or ball bearings allowing free movement of the planet wheels. Such installation is generally satisfactory, particularly when the load applied to the device is moderate. When, however, the torque loads are heavy, noticeable deformations in the mechanism occur, causing the teeth of the mating gears to mesh incorrectly, creating undue wear as well as harmful stress and strain. This problem is particularly significant in aeronautical applications wherein high torque loads are required on gearing mechanisms whose sizes and weights must be maintained at the barest minimum.

An attempt has been made to overcome the drawbacks of the conventional devices by arranging each planet wheel on the planet carrier in such a manner that the wheel swings about its own axis, thereby permitting the wheel to assume as near an ideal position as is possible during operation. In one arrangement, the planet wheels are mounted about a self-aligning spherical roller bearing. Such an arrangement does completely permit the mutual meshing of the gearing teeth and requires considerable effort and mechanism to construct and to maintain properly adjusted. Another arrangement has been to mount the planet wheel on a nonself adjusting roller bearing and connecting the bearing via a self-adjusting ball to a journal or spindle mounted on the axle. This latter arrangement also does not permit completely satisfactory meshing of the gear teeth. Additionally, it requires considerably more complex structural mechanism to secure the bearing to the journal, and must include a ball housing and key means to prevent the rotation of the ball.

It is the primary object of the present invention to provide a planetary reduction gear which is simple in construction and effective in operation, particularly under relatively high torque loads.

It is a further object of this invention to provide a planetary reduction gear unit which may be constructed of lightweight material, be of a small size, and yet be capable of handling relatively high torque loads.

It is a more specific object of the invention to provide a planetary gearing unit having improved means for mounting the planet wheels on the planet carrier.

It is yet another object of the invention to provide a planetary gearing unit in which the planet wheels are mounted on the planet carrier so that their axes of rotation and their axes of support are offset from each other and are thereby automatically adjustable relative to each other to compensate for the effect of the variations to torque load placed upon the planet wheel.

These objects as well as others, together with numerous advantages of the present invention, will become more apparent from the following description of a preferred embodiment thereof.

According to the present invention, there is provided a system for mounting a planet wheel on an axle extending from a rotatory carrier, wherein the wheel is provided with an interior surface concentric with its pitch circle. The interior surface forms the outer race of a roller bearing, the inner race being formed of a journal member having an outer surface concentric to the pitch circle. The journal member is mounted, along an axis eccentric to the pitch circle, on the axle so that the axis of rotation of the planet wheel is offset from the axis of support.

In the preferred form, the roller bearings employed are nonself-alignable. Also the axis of support is offset from the axis of rotation of the carrier.

In the following description, reference is made to the accompanying drawing wherein the present invention is shown for illustrative purposes only as applied to an epicyclic reduction gear having four planetary wheels.

Figure 1:
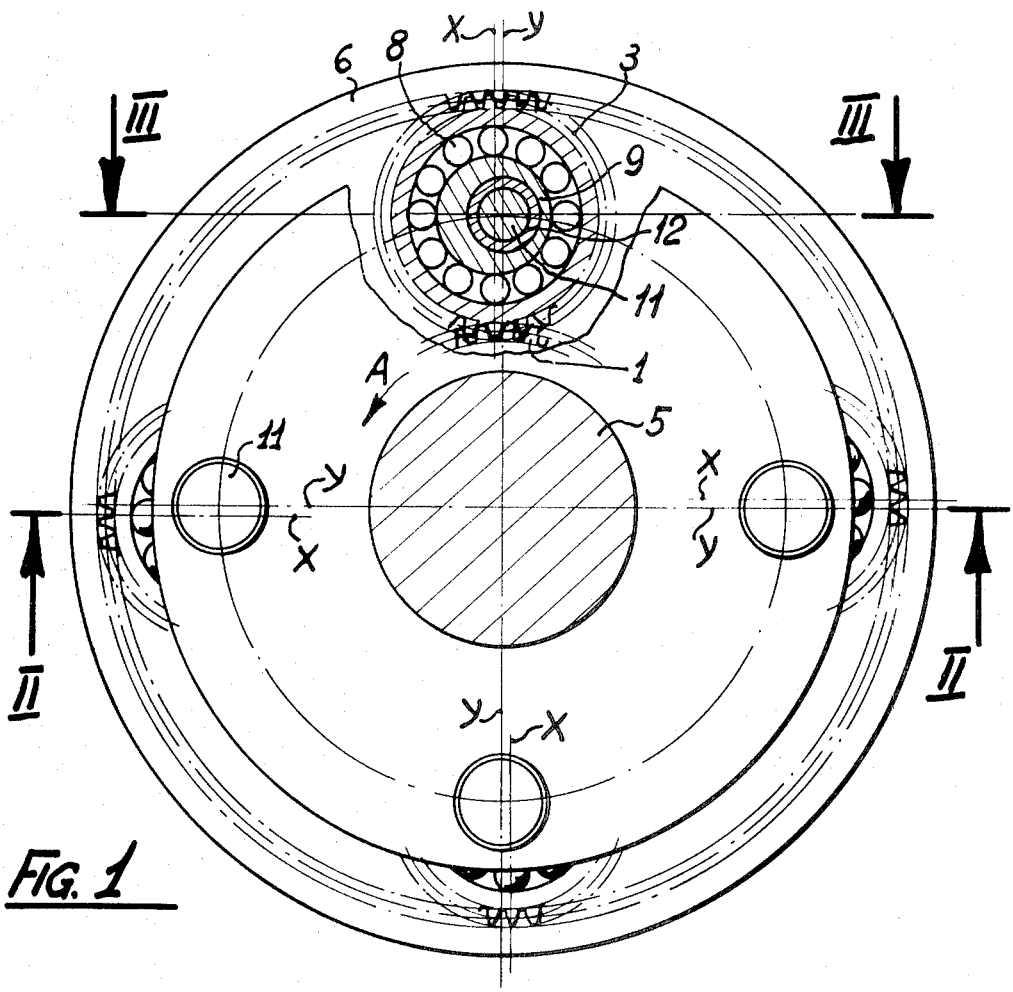
FIG. 1 is a partially sectioned view of the gear seen in the direction of the axis of rotation.
Figure 2:
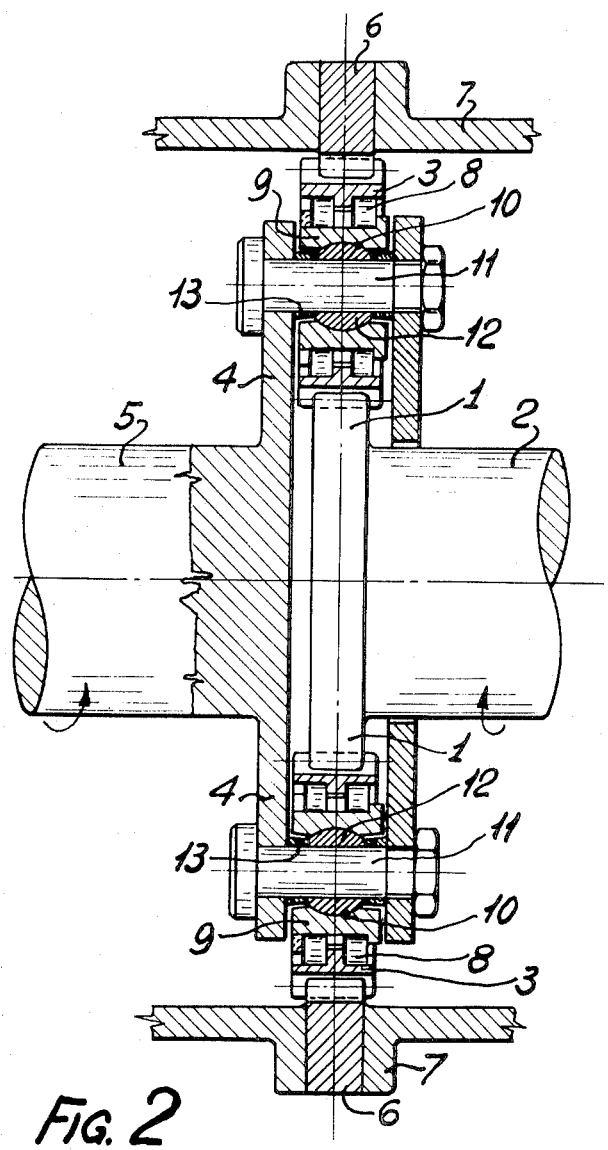
FIG. 2 is a section taken along lines 2—2 of FIG. 1.

As seen in FIGS. 1 and 2, the present invention is embodied in a planetary gear unit having a central sun gear 1 keyed in conventional manner to the end of a driving shaft 2 and about which are arranged a plurality of planet wheels 3. The planet wheels 3 are mounted on a roller bearing assembly in accord with present invention upon a carrier 4 which is itself secured to a driven shaft 5 and simultaneously meshes with an internal ring gear 6 fixedly mounted in an outer casing 7. For purposes of this description, the carrier is adapted to be rotated counterclockwise in the direction of the arrow A.

Figure 3:
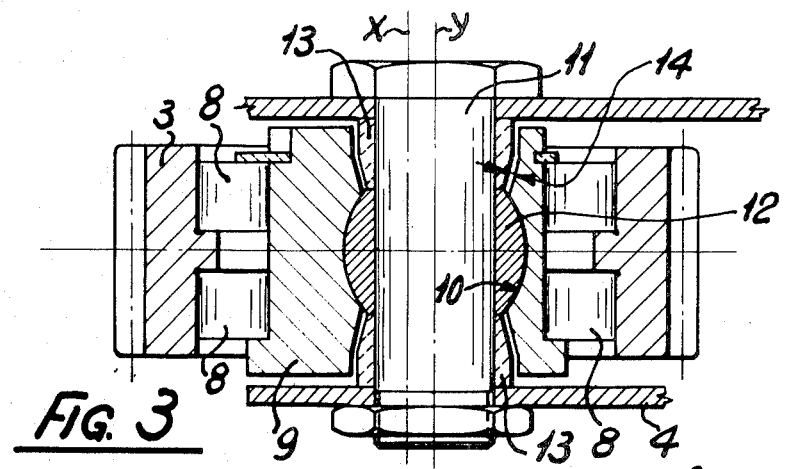
FIG. 3 is a section taken along lines 3—3 of FIG. 1.

The mounting of the planet wheels 3 is best seen in FIG. 3. Each of the planet wheels 3 is mounted for rotation about and axis X—X and has an internal concentric surface which forms the outer race for a plurality of nonself-aligning roller bearings 8 which also ride on an inner race formed by the outer surface of a tubular sleeve 9. The respective race surface of the planet wheel 3 and the sleeve 9 are concentric about the pitch circle of the planet wheel, being also coaxial with the axis X—X, and are provided with formed shoulders and retaining means for preventing axial movement of the rollers 8.

The tubular sleeve 9 is provided with an internal bore 10 having a circular transverse cross section and is supported on a pin axle or shaft 11 mounted in the planet carrier 4. Suitable washer and nut means secure the axle 11 to the carrier 4 and retain the planet wheel 3, bearing rollers 8 and sleeve 9 about the axle and adjacent the carrier 4. The bore 10 is not concentric with the outer surface of the tubular sleeve 9 but, together with the axle 11, is coaxial about a longitudinal axis Y—Y, constituting the supporting axis of the planet wheel, is thus offset from the axis X—X which is the axis of rotation.

The internal bore 10 of the tubular sleeve 9 is in longitudinal cross section provided with a spherical shape, as seen in FIG. 3, to form a housing for journal ball 12. The ball 12 is diametrically fitted over the spindle 11 and provides a bearing support for the sleeve 9. A pair of cylindrical spacers 13, respectively abutting at each of its ends the carrier 4 or its retaining washer and the ball 12 maintains the ball against axial movement. The spacers 13 and the surface of the bore 10 are correspondingly formed and are spaced from each other a predetermined distance 14 to permit a desired degree of freedom of movement of the tubular sleeve 9 relative to the spindle 11 about the ball 12.

In accordance with the present invention, the axis y—Y of the bore 10 is offset from the axis X—X in the direction opposite to the direction of movement of the carrier 4, as shown by the arrow A. That is, when the unit is operated, the axis of central shaft 2. The axes X—X and Y—Y extend parallel to each other and parallel to the central axis of the shaft of 2 or planet carrier 4.

The aforemention gearing unit operates so that, when the shaft 2 and thus the sub gear 1 are rotated in the direction of arrow A, all of the planet wheels 3 are driven. Since the wheels 3 mesh with the stationary ring gear 6, the planet wheels and their respective axes X—X are caused to describe an orbit about the central axis of the shaft 2 in convention manner. The orbiting of the planet wheels 3 causes the axles 11 with their respective axes Y—Y to follow, swinging the eccentrically formed sleeve 9 about the ball 12. As the sleeve 9 swings, it assumes a balanced position with respect to the axis X—X, determined by the degree of torque as well as the speed of rotation. On the other hand, because of the eccentric mounting of the planet wheels 3, the ball 12 does not turn, remaining relatively fixed on the axle 11, during operation.

The arrangement described above has a number of advantages arising out of the relative offset positioning of the supporting axis and the axis of rotation. By the above construction, each planet wheel is able to assume a balanced position with respect to the forces acting upon it so that the best distribution of load between the mutually meshing gear teeth and other contacting components can be effected. Once such a balanced position is obtained, the eccentrically supported elements are prevented from turning about their own support, i.e., the axle 11, and the balanced position is maintained during operation.

Should the forces acting upon the planet wheel vary during the course of operation, a new balanced position will be immediately obtained. Even though the ball 12 is concentrically supported on the axle 11 and the inner race of the tubular sleeve 9 are prevented from turning about their own axes, the planet wheel 3, because of its eccentric support, can be thus swung about its own housing, automatically taking the most suitable position for proper meshing of the gear teeth.

It will be obvious that various modifications and changes may be made to the construction of the present device. For example, the degree of offset between the axis of rotation and the axis of support may be varied as a result of size, speed and torque applied to the device. The form of retaining means 13 for holding the ball 12 may be replaced with suitable washer or other retaining means. The roller bearings 8 may be replaced with suitable nonself-aligning ball bearings.

It will be appreciated, therefore, that the present description is to be taken as illustrative only of the invention and not limiting thereof.

I claim:

1. In a planetary gear unit, the combination of a sun wheel, a ring gear, a set of planet wheels meshing with said sub wheel and with said ring gear, a planet wheel carrier adapted to be rotated in one direction when the sun wheel is driven, a set of shafts supported by said carrier, and a set of sleeves eccentrically mounted on said shafts so that the axes of the shafts are offset from the axes of said sleeves in a direction opposite to said one direction of rotation of said carrier, said planet wheels being rotatably mounted on said sleeves concentrically with the sleeve axes, the gear unit being further characterized in that said sleeves with said planet wheels thereon are eccentrically self-adjusting independently on one another on their respective shafts.

2. The planetary gear unit as defined in claim 1 together with a set of spherical bearing members provided on the respective shafts, said sleeves with their associated planet wheels being rockable on said bearing members in planes parallel to the shaft axes.

3. The planetary gear unit as defined in claim 1 together with antifriction bearing means provided between said sleeves and the respective planet wheels.

* * * * *